United States Patent
Han et al.

(10) Patent No.: US 12,310,531 B2
(45) Date of Patent: May 27, 2025

(54) AIR FRYER DRAWER AND AIR FRYER

(71) Applicant: IB APPLIANCES US HOLDINGS LLC, Downers Grove, IL (US)

(72) Inventors: Yude Han, Hangzhou (CN); Jianxin Chen, Hangzhou (CN); Justin Lim, Toronto (CA); Jason Lepinske, Chicago, IL (US); Hongyuan Wang, Hangzhou (CN); Guoying He, Hangzhou (CN)

(73) Assignee: IB Appliances US Holdings, LLC, Chicago, IL (US)

( * ) Notice: Subject to any disclaimer, the term of this patent is extended or adjusted under 35 U.S.C. 154(b) by 471 days.

(21) Appl. No.: 17/714,344

(22) Filed: Apr. 6, 2022

(65) Prior Publication Data
US 2022/0330748 A1   Oct. 20, 2022

(30) Foreign Application Priority Data

Apr. 20, 2021 (CN) .......................... 202120815780.0

(51) Int. Cl.
*A47J 37/06* (2006.01)

(52) U.S. Cl.
CPC ....... *A47J 37/0641* (2013.01); *A47J 37/0664* (2013.01)

(58) Field of Classification Search
CPC ... A47J 37/0664; A47J 37/0641; A47J 45/067
USPC ...................................................... 126/21 R
See application file for complete search history.

(56) References Cited

U.S. PATENT DOCUMENTS

| | | | |
|---|---|---|---|
| 5,005,255 A | * | 4/1991 | Pare ...................... E05B 1/0015 16/429 |
| 2014/0239005 A1 | * | 8/2014 | Cuillery .................. A47J 45/10 220/759 |

FOREIGN PATENT DOCUMENTS

| | | | |
|---|---|---|---|
| CN | 204105798 U | | 1/2015 |
| CN | 104997434 A | * | 10/2015 |
| CN | 104274088 B | | 8/2016 |
| CN | 207604865 U | * | 7/2018 |
| CN | 108618651 A | | 10/2018 |
| CN | 108670048 A | | 10/2018 |
| CN | 209610896 U | * | 11/2019 |

(Continued)

OTHER PUBLICATIONS

Chinese to English machine translation for CN-209610896-U.*

(Continued)

*Primary Examiner* — Michael G Hoang
*Assistant Examiner* — Elizabeth Ann Laughlin
(74) *Attorney, Agent, or Firm* — Crowell & Moring LLP

(57) ABSTRACT

An air fryer drawer includes a panel, a fryer basket fixed to the rear side of the panel to receive food to be fried, and a handle disposed at the front side of the panel, the panel being provided with a transparent area through which a user can observe the conditions of the food being fried in the fryer basket. The handle includes a grip handle segment, and is capable of rotating between a first state and a second state relative to the panel, the grip handle segment being located at the front side of the transparent area when the handle is in the first state to facilitate manipulation of the grip handle segment, and the grip handle segment being deviated from the transparent area when the handle is in the second state to facilitate observation of the conditions of the food being fried in the fryer basket.

7 Claims, 16 Drawing Sheets

(56) References Cited

FOREIGN PATENT DOCUMENTS

| | | | |
|---|---|---|---|
| CN | 209712627 U | * | 12/2019 |
| CN | 209996067 U | | 1/2020 |
| CN | 210138081 U | | 3/2020 |
| CN | 210169798 U | | 3/2020 |
| CN | 211324486 U | * | 8/2020 |

OTHER PUBLICATIONS

Chinese to English machine translation for CN-209712627-U.*
Chinese to English machine translation for CN-104997434-A.*
Chinese to English machine translation for CN-207604865-U.*
Chinese to English machine translation for CN-211324486-U.*
Extended European Search Report for European Patent Application No. 221687999 dated Sep. 20, 2022, 5 pages.

* cited by examiner

AIR FRYER DRAWER AND AIR FRYER

RELATED APPLICATION

The present application claims priority to Chinese Patent Application Number CN2021208157800, filed on Apr. 20, 2021, the entirety of which is hereby incorporated by reference.

FIELD

The present disclosure relates to an air fryer drawer and an air fryer and, more particularly, to an air fryer drawer and an air fryer that facilitates user observation of cooking conditions.

BACKGROUND

Utility Model Patent CN209610896U of Cixi Yueda Electronic Technology Co., Ltd., published on Nov. 12, 2019, discloses an air fryer with a double-layer transparent viewing window. The drawer structure is provided with a transparent area to allow a user to observe the conditions of the food being fried in the basket. However, because the handle is located in front of the transparent area, the user's vision is partially blocked by the handle, and this affects user observation.

SUMMARY

Therefore, the present disclosure aims to resolve various technical problems by providing an air fryer drawer and an air fryer that facilitates observation of cooking conditions.

The present disclosure provides an air fryer drawer comprising: a panel, a fryer basket fixed to the rear side of the panel to receive food to be fried, and a handle disposed at the front side of the panel, the panel being provided with a transparent area through which a user can observe the conditions of the food being fried in the fryer basket, the handle comprising a grip handle segment, the handle being capable of rotating between a first state and a second state relative to the panel, the grip handle segment being located at the front side of the transparent area when the handle is in the first state to facilitate manipulation of the grip handle segment, the grip handle segment being deviated from the transparent area when the handle is in the second state to facilitate observation of the conditions of the food being fried in the fryer basket.

In some embodiments, the handle of an embodiment of the present disclosure is capable of being rotated between a first state and a second state relative to the panel, so that the grip handle segment can be deviated from the transparent area to prevent the grip handle segment from blocking the transparent area, thereby facilitating user observation of the cooking conditions in the fryer basket.

Further, the air fryer drawer comprises a locking device and a device for unlocking, wherein the locking device locks the handle when the handle is in the first state and is non-rotatable, and wherein the handle can be rotated to the second state by operating the locking device and causing the locking device to be unlocked.

In some embodiments, the locking device of an embodiment of the present disclosure is capable of locking the handle to prevent the handle from being rotated and facilitate holding of the handle for operational convenience of the air fryer drawer.

Further, the panel is provided with a receiving portion, the device for locking being subjected to force causing the locking device to switch between a first position and a second position, one end of the locking device being inserted into the receiving portion when the locking device is in the first position, at which time the handle is non-rotatable; and, wherein the one end of the locking device exits the receiving portion when the locking device is in the second position, at which time the handle is rotatable.

Further, the device for unlocking comprises a pressing portion and an upper inclined portion disposed thereon, the locking device comprising a lower inclined portion, and when the pressing portion is pressed, the upper inclined portion moves along the lower inclined portion to drive the locking device to move.

In some embodiments, the device for unlocking of an embodiment of the present disclosure is structurally simple and convenient to operate.

Further, the air fryer drawer comprises a first elastic member located between the locking device and the handle, the first elastic member being pressed by the locking device when the locking device moves from the first position to the second position; wherein when the device for unlocking is released, the elastic force of the first elastic member butts against the locking device, causing the locking device to move to the first position. The air fryer drawer further comprises a second elastic member located between the device for unlocking and the locking device; wherein when the device for unlocking is released, the butting force of the second elastic member drives the device for unlocking to move upward, thus preventing the device for unlocking from hindering the movement of the locking device toward the first position.

Further, the axis of rotation of the handle relative to the panel is vertically disposed, and the locking device moves perpendicularly to the axis.

Further, the handle comprises a horizontal connecting segment whose one end can be rotatably connected to the panel and the grip handle segment connected to the other end of the horizontal connecting segment, the locking device being disposed on the horizontal connecting segment.

Further, the other end of the grip handle segment is extended downward and connected to another horizontal connecting segment, the another horizontal connecting segment being rotatably connected to the panel.

Further, the air fryer drawer comprises spindles rotatably connected to the handle and the panel, the spindles being provided with through holes for the locking device to pass through.

Further, the panel is provided with a receiving portion, wherein the device for unlocking comprises a pressing portion, the handle comprises a supporting portion configured to support the locking device, the locking device comprises a locking portion, and the supporting portion is located between the locking portion and the device for unlocking; wherein when the pressing portion is pressed, the locking device is butted against such that the locking device swings relative to the supporting portion, thereby causing the locking portion to be inserted into the receiving portion and making the handle non-rotatable.

Further, the air fryer drawer comprises a third elastic member and a fourth elastic member, the third elastic member being located between the device for unlocking and the locking device; wherein when the pressing portion is pressed, the device for unlocking presses the third elastic member, causing the third elastic member to butt against the locking device, the fourth elastic member being located between the locking device and the handle.

Further, the panel comprises a plurality of receiving portions, and the air fryer drawer comprises a stop disposed at the handle; wherein when the handle is rotated relative to the panel, the stop is received in the receiving portion so that the position of the grip handle segment relative to the transparent area can be adjusted.

In some embodiments, provision of the stop of an embodiment of the present disclosure enables adjustment of the position of the grip handle segment relative to the transparent area and provides multiple angles of rotation to meet different requirements.

Further, the air fryer drawer comprises a pivot shaft assembled with the panel and the handle that is configured to rotatably limiting the handle to the panel, the pivot shaft being disposed perpendicularly to the panel, and the handle being capable of being rotated toward the upper-left direction and/or the upper-right direction, so that the grip handle segment is deviated from the transparent area.

The present disclosure further provides an air fryer comprising a main body having a cooking chamber, and an air fryer drawer as defined above, the air fryer drawer being inserted into the cooking chamber.

DETAILED DESCRIPTION

Figure 1:
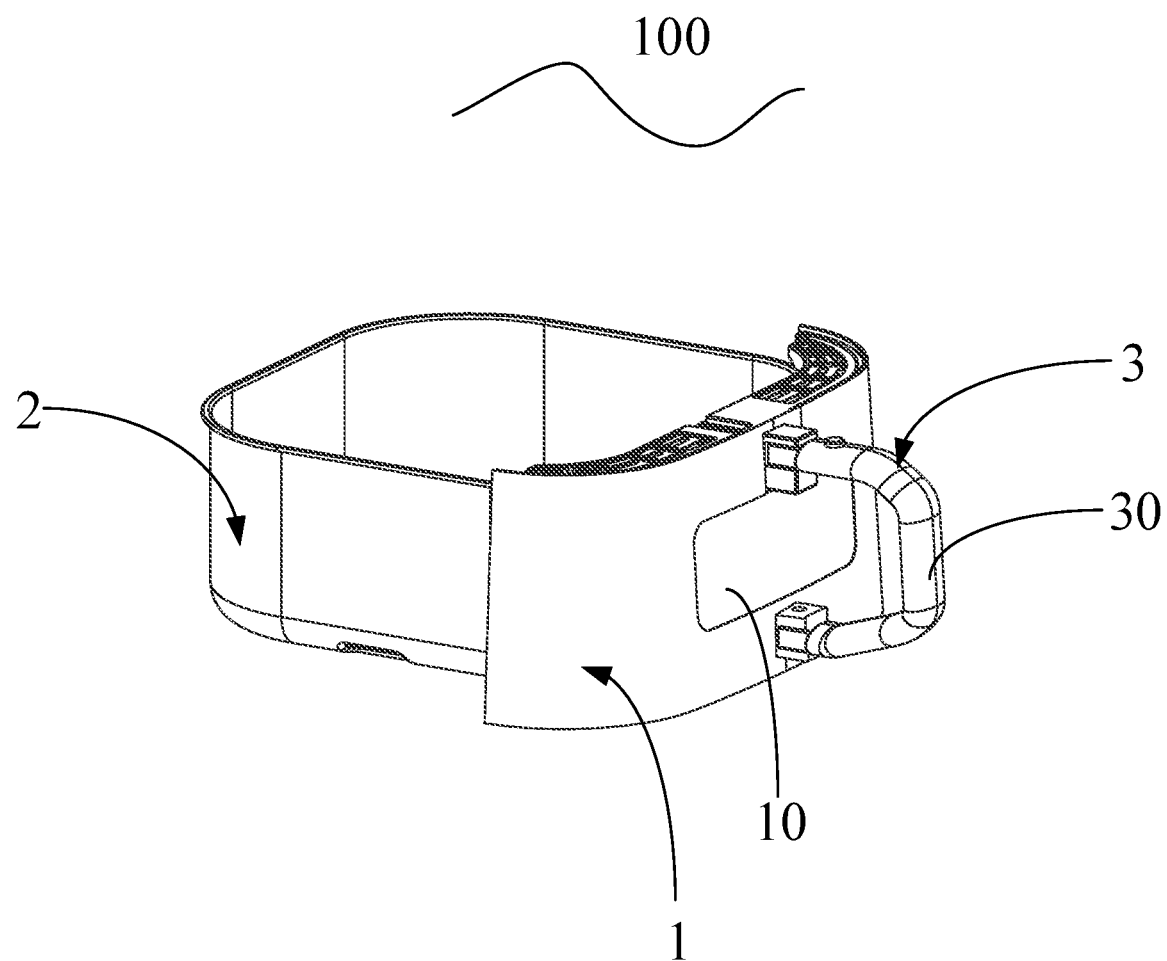
FIG. 1 is a schematic view of an air fryer drawer of a first embodiment of the present disclosure, wherein the handle is in a first state.
Figure 2:
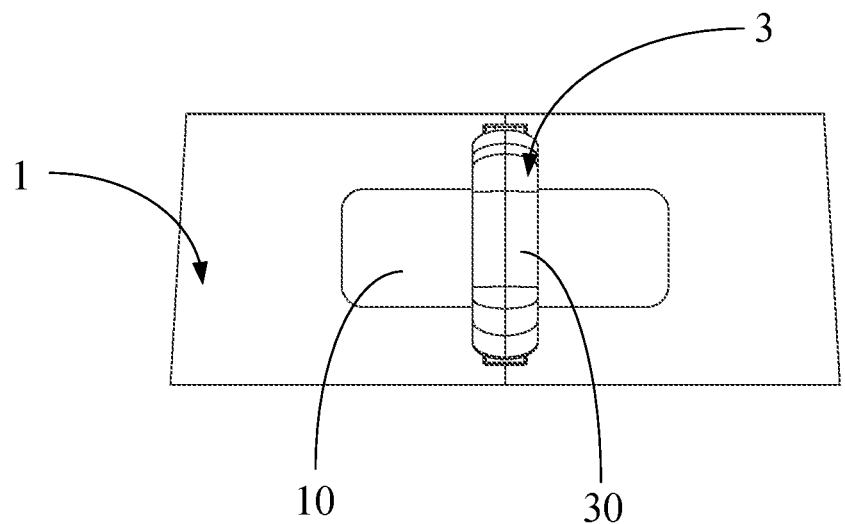
FIG. 2 is a front view of the air fryer drawer shown in FIG. 1.
Figure 3:
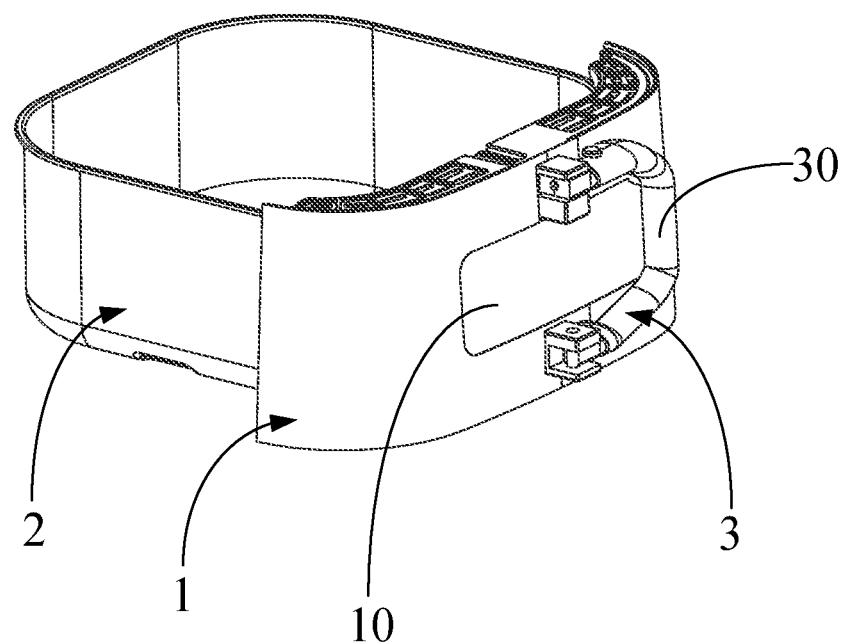
FIG. 3 is a schematic view of the air fryer drawer shown in FIG. 1, wherein the handle is in a second state and the grip handle segment is located on the right of the transparent area.
Figure 4:
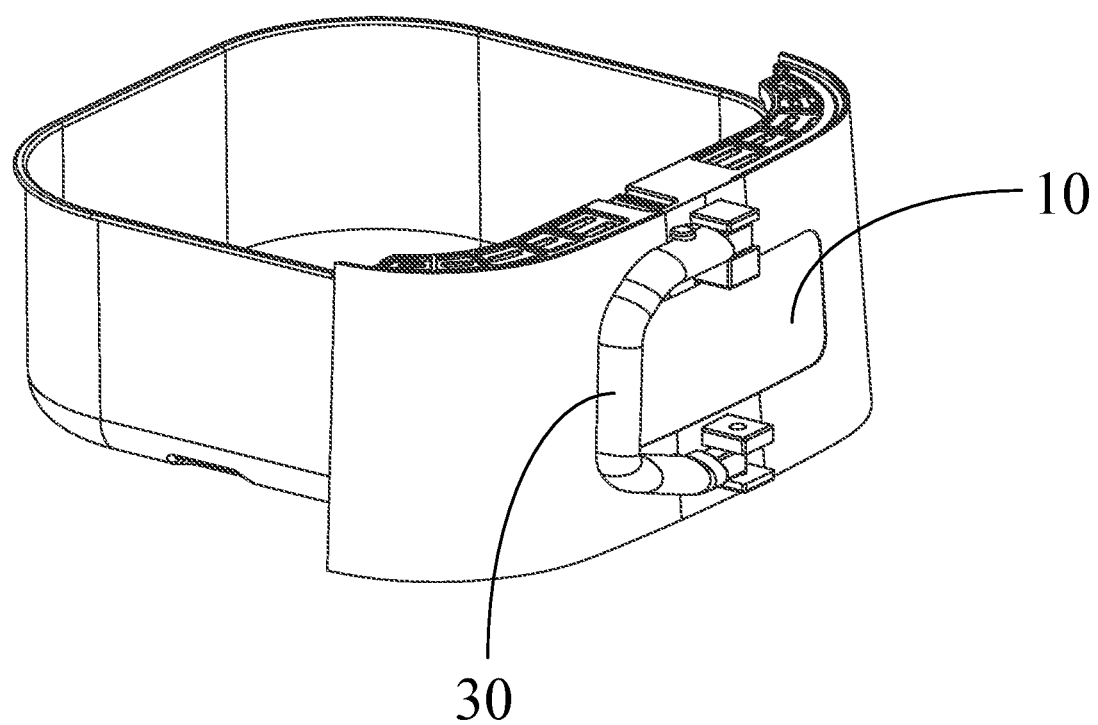
FIG. 4 is similar to FIG. 4, wherein the grip handle segment is located on the left of the transparent area.

Here the exemplary embodiments will be described in detail with reference to the accompanying drawings. Unless otherwise stated in the description of the accompanying drawings, it is to be noted that same numerals represent the same or similar elements. The exemplary embodiments described below do not represent all embodiments consistent with the present application. On the contrary, they are merely examples of devices consistent with some aspects of the present disclosure described in detail in the appended claims.

The terms used in the present disclosure are merely intended to describe specific embodiments instead of limiting the present disclosure. Unless otherwise defined, the technical or scientific terms used in the present disclosure shall have ordinary meanings commonly understood by persons of ordinary skills in the art. The terms "first", "second" and the like used in the description and claims of the present disclosure do NOT indicate any sequence, quantity or importance, but are intended to identity different constituent parts. Similarly, words such as "one" or "a" also do NOT indicate quantity limits, but indicates the presence of at least one. "A plurality of" or "several" indicate two or more. Unless otherwise indicated, the terms "front section", "rear section", "lower section" and/or "upper section" and the like are merely intended for facilitating illustration, instead of limiting to a location or spatial orientation. The terms "comprises" or "includes" and the like are intended to refer to the components or items appearing before the words "comprises" or "includes", including the components or items appearing after the words "comprises" or "includes" and their equivalence, and do NOT exclude other components or items. The terms "connect" or "link" and the like are not limited to physical or mechanical connections, and may include electrical connections, be they direct or indirect. Unless otherwise clearly defined by context, the singular forms "a", "the" and "that" used in the description and claims of the present disclosure are intended to include the plurals. It must also be understood that the words "and/or" used herein refer to and include any and all possible combinations of one or a plural number of associated listed items.

An air fryer of an embodiment of the present disclosure comprises a main body (not shown in figures) having a cooking chamber, and an air fryer drawer 100 inserted into the cooking chamber. Shown in FIGS. 1 to 13 is an air fryer drawer of a first embodiment of the present disclosure.

As shown in FIGS. 1 to 5, the air fryer drawer 100 comprises a panel 1, a fryer basket 2 fixed to the rear side of the panel 1 to receive food to be fried, a handle 3 disposed at the front side of the panel 1, a locking device 4 disposed on the handle 3, a device for unlocking 5, a first elastic member 7, a second elastic member 8, and a pair of spindles 6 assembled with the handle 3 and the panel 1 respectively.

The panel 1 is provided with a transparent area 10 through which a user can observe the conditions of the food being fried in the fryer basket 2. The handle 3 is configured to be handheld to facilitate pulling of the air fryer drawer 100. The handle 3 comprises a grip handle segment 30.

The handle 3 is capable of being rotated between a first state and a second state relative to the panel 1. When the handle 3 is in the first state, the locking device 4 locks the handle 3, causing the handle 3 to be non-rotatable, at which time the grip handle segment 30 can be handheld for the air fryer drawer 100 to be pulled out or lifted up. The handle 3 can be rotated to the second state by operating the device for unlocking 5 to cause the locking device 4 to be unlocked, at which time the grip handle segment 30 is deviated from the transparent area 10 to facilitate user observation of the conditions of the food being fried in the fryer basket 2.

The handle 3 is capable of being rotated relative to the panel 1 toward the left and right of the transparent area 10, so that the grip handle segment 30 is deviated from or positioned to the side of the transparent area 10. The handle 3 may be configured to be only rotatable toward the left side or only rotatable toward the right side of the transparent area 10.

The panel 1 may be made of a transparent material to form the transparent area 10, or the panel 1 is provided with a window, and the air fryer drawer 100 comprises a transparent member covering the window. The transparent member is made of a transparent material such as polycarbonates (PC), acrylonitrile butadiene styrene (ABS) plastic, polymethyl methacrylate (PMMA), glass, etc.

Figure 6:
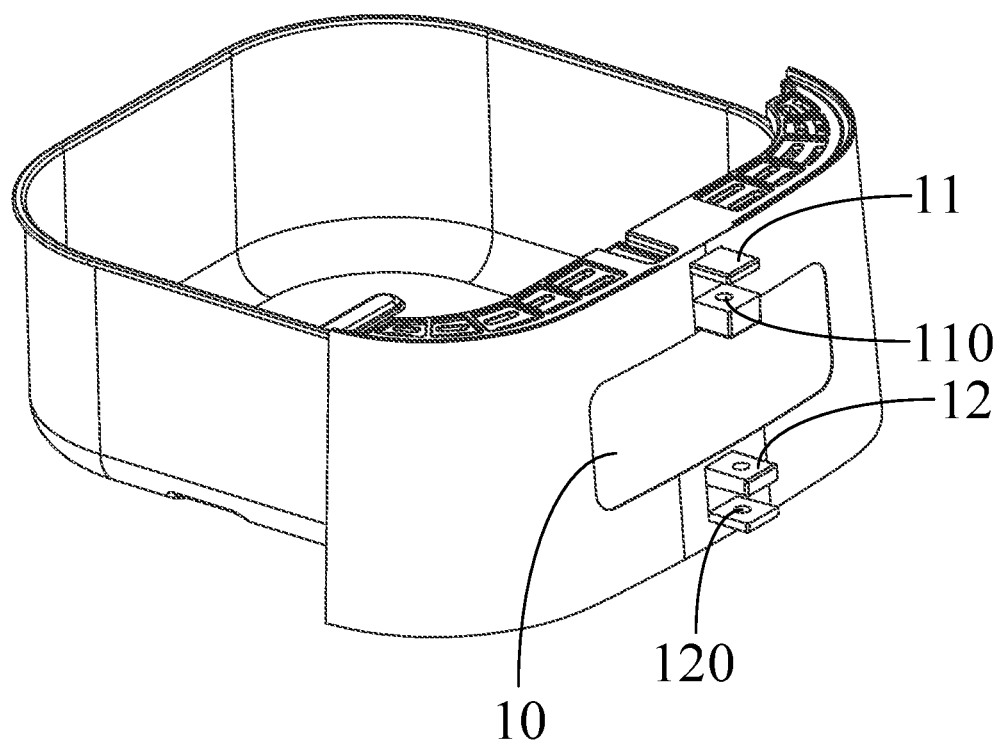
FIG. 6 is a schematic view illustrating the panel and drawer basket shown in FIG. 5.
Figure 7:
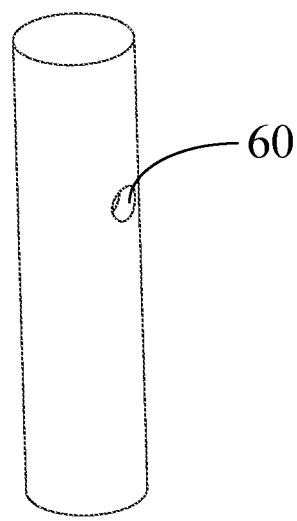
FIG. 7 is a schematic view of a spindle shown in FIG. 5.

As shown in FIG. 6, the panel 1 comprises a pair of upper fastening portions 11 and a pair of lower fastening portions 12. The pair of upper fastening portions 11 is provided with upper fastening holes 110. The pair of lower fastening portions 12 is provided with lower fastening holes 120. Both ends of one of the spindles 6 are assembled within the upper fastening holes 110 respectively, so that the spindle 6 is limited to the upper fastening portions 11. Both ends of the other spindle 6 are assembled within the lower fastening portions 12 respectively, so that the spindle 6 is limited to the lower fastening portions 12. As shown in FIG. 7, the spindle 6 is provided with a through hole 60.

Figure 11:
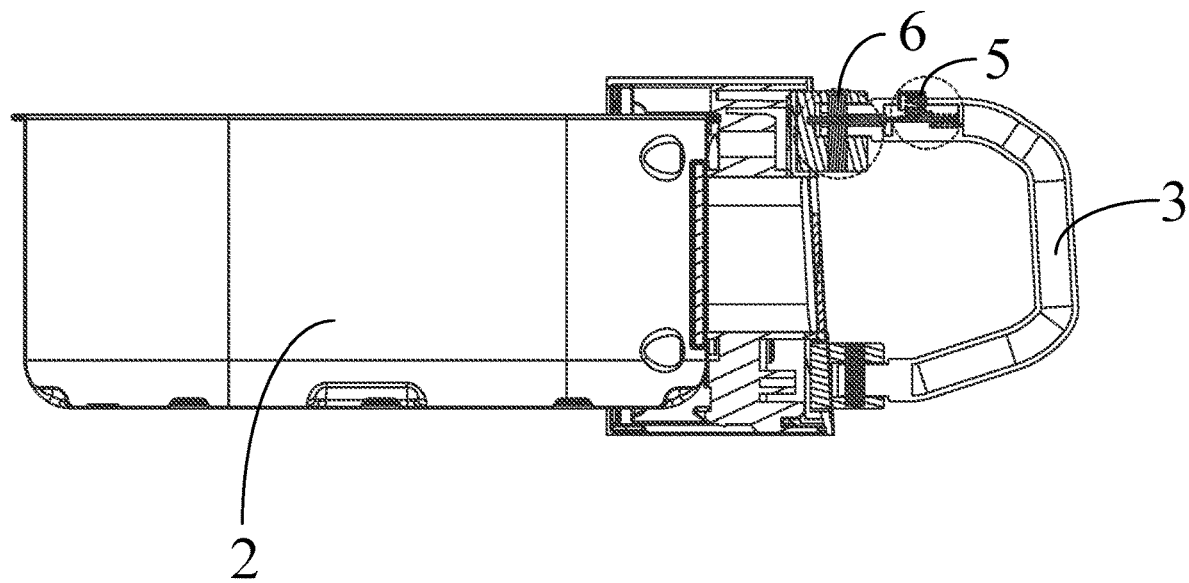
FIG. 11 is a schematic sectional view of the air fryer drawer shown in FIG. 1.
Figure 12:
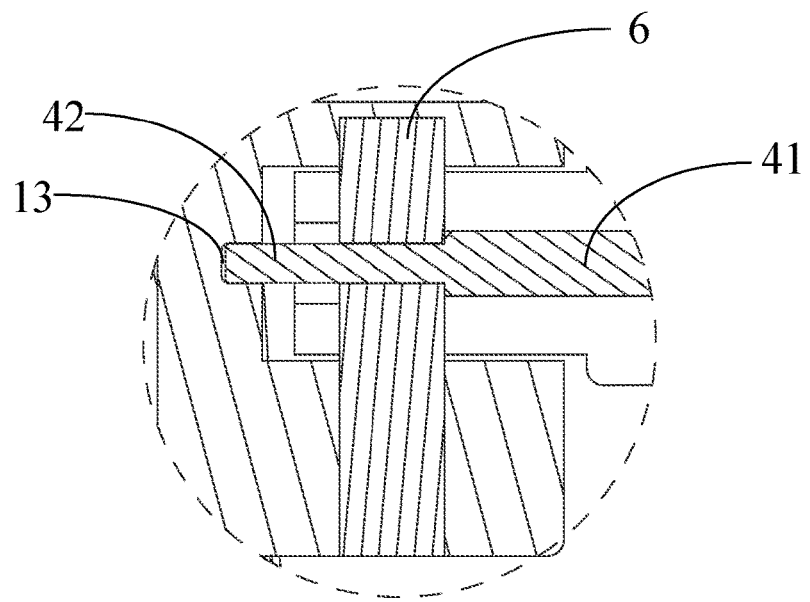
FIG. 12 is an enlarged view A of a circled portion of the schematic sectional view shown in FIG. 11.

As shown in FIGS. 11 and 12, the panel 1 is provided with a pair of receiving portions 13. One of the receiving portions 13 is located between the pair of upper fastening portions 11. The other receiving portion 13 is located between the pair of lower fastening portions 12. The receiving portion 13 are aligned with the through hole 60.

Figure 8:
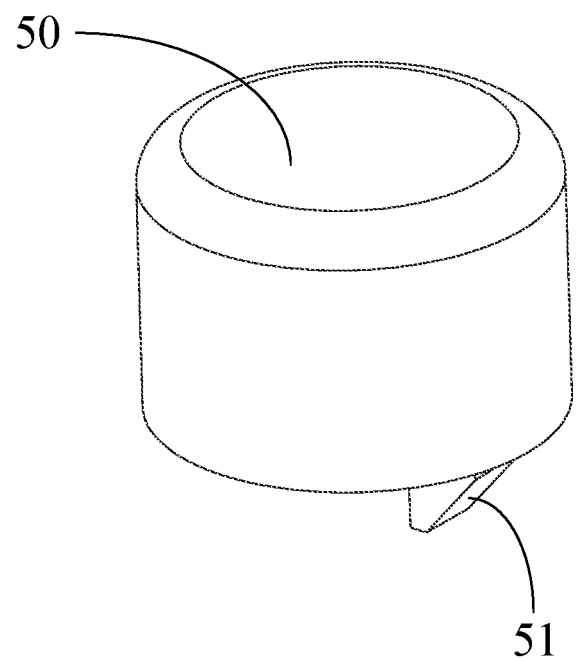
FIG. 8 is a schematic view of a device for unlocking shown in FIG. 5.
Figure 9:
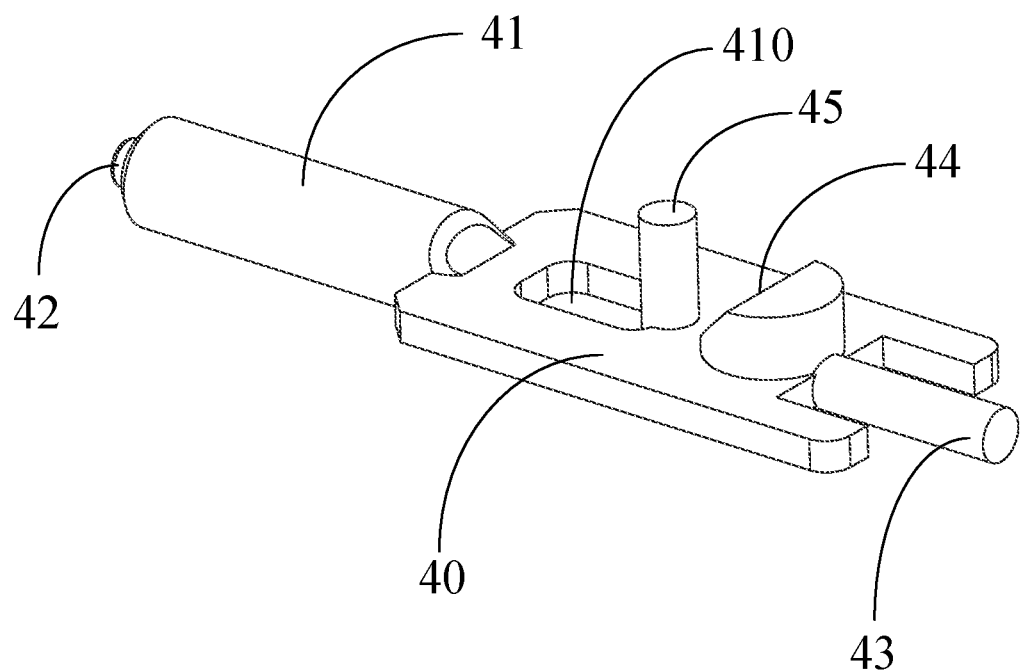
FIG. 9 is a schematic view of a locking device shown in FIG. 5.

As shown in FIGS. 8 and 9, the device for unlocking 5 comprises a pressing portion 50 and an upper inclined portion 51 disposed thereon. The upper inclined portion 51 is extended downward from the pressing portion 50. The pressing portion 50 is roughly cylindrical to facilitate finger pressing. The locking device 4 comprises a base portion 40, a connecting portion 41 extended forward from the base portion 40, a locking portion 42 extended forward from the connecting portion 41, a first limiting portion 43 extended backward from the base portion 40, a lower inclined portion 44 extended upward from the base portion 40, and a second limiting portion 45 extended upward from the base portion 40. The first limiting portion 43 and the second limiting portion 45 are cylindrical. The base portion 40 is provided with a through hole 410 located between the second limiting portion 45 and the connecting portion 41.

Figure 5:
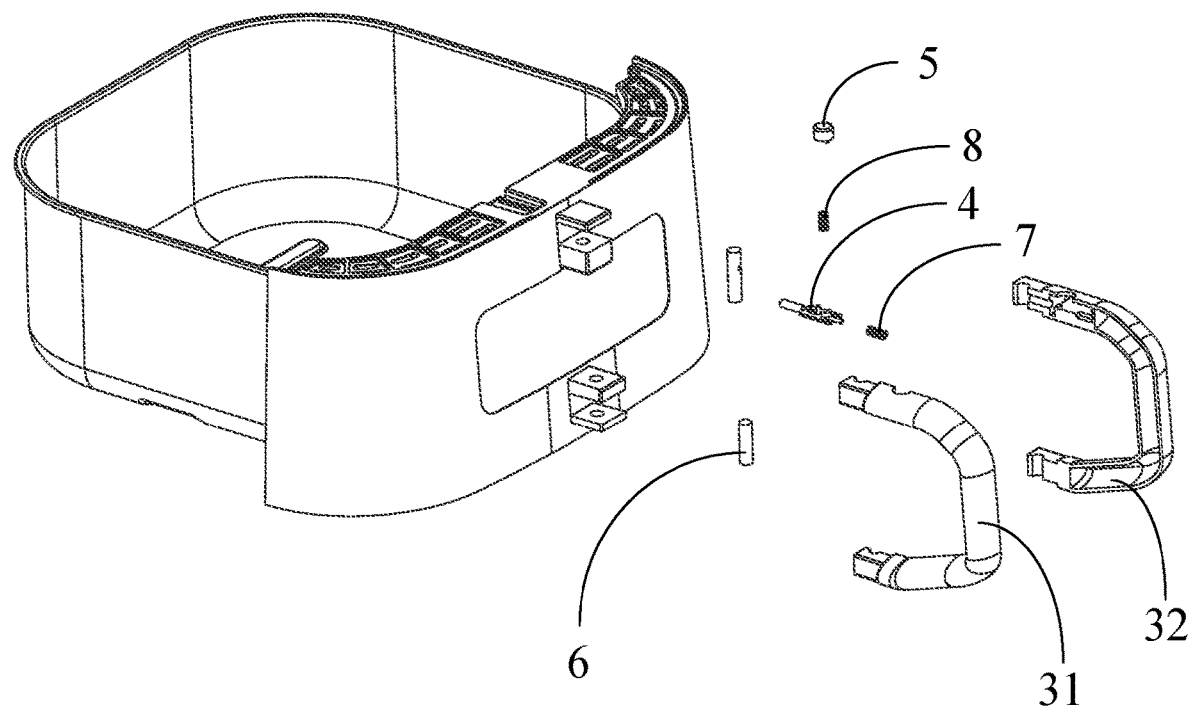
FIG. 5 is an exploded view of the air fryer drawer shown in FIG. 2.
Figure 10:
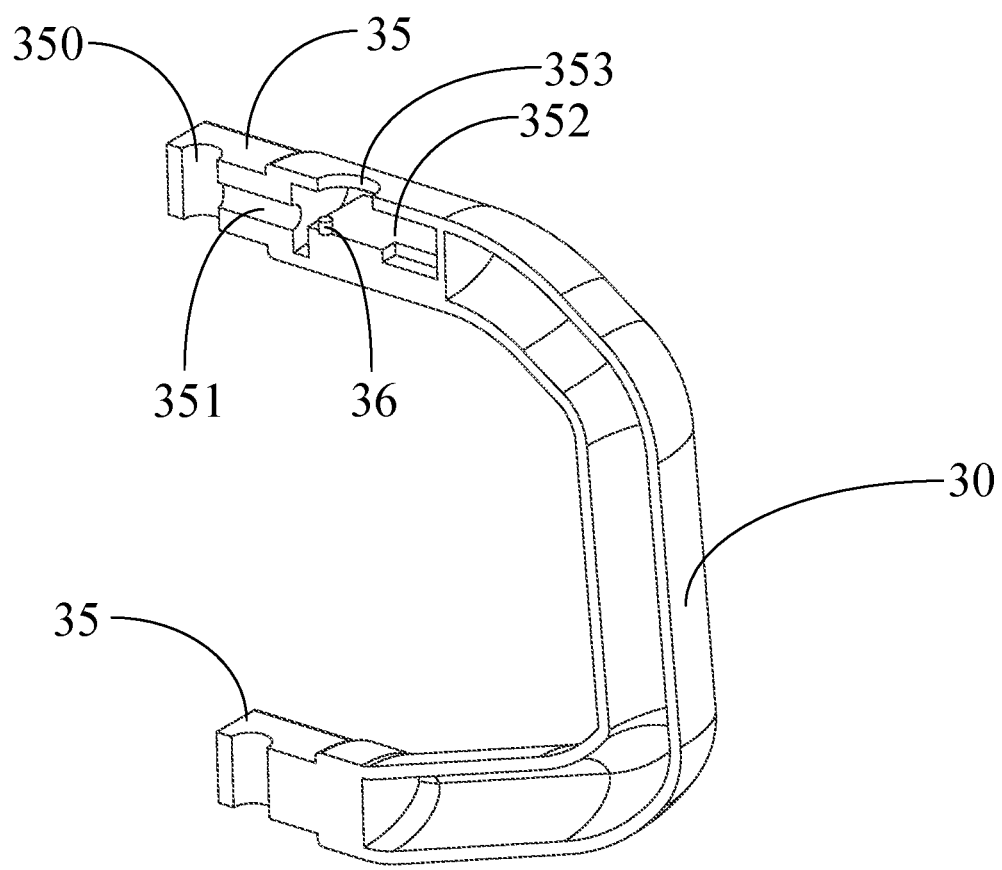
FIG. 10 is a schematic view of a handle shown in FIG. 5.

As shown in FIGS. 5 and 10, the handle 3 comprises a left handle 31 and a right handle 32 assembled together. The handle 3 comprises a pair of horizontal connecting segments 35 extended slantingly upward and slantingly downward respectively from both ends of the grip handle segment 30. One end of the horizontal connecting segment 35 is rotatably connected to the panel 1. The locking device 4 is disposed on the horizontal connecting segment 35.

One of the horizontal connection segments 35 is provided with an assembly hole 350, a receiving groove 351, a receiving space 352 and a through hole 353, which are connected. The assembly hole 350 is perpendicular to the receiving groove 351. The receiving groove 351 is located between the assembly hole 350 and the receiving space 352. The handle 3 further comprises a third limiting portion 36 extended into the receiving space 352. The third limiting portion 36 is cylindrically structure.

Figure 13:
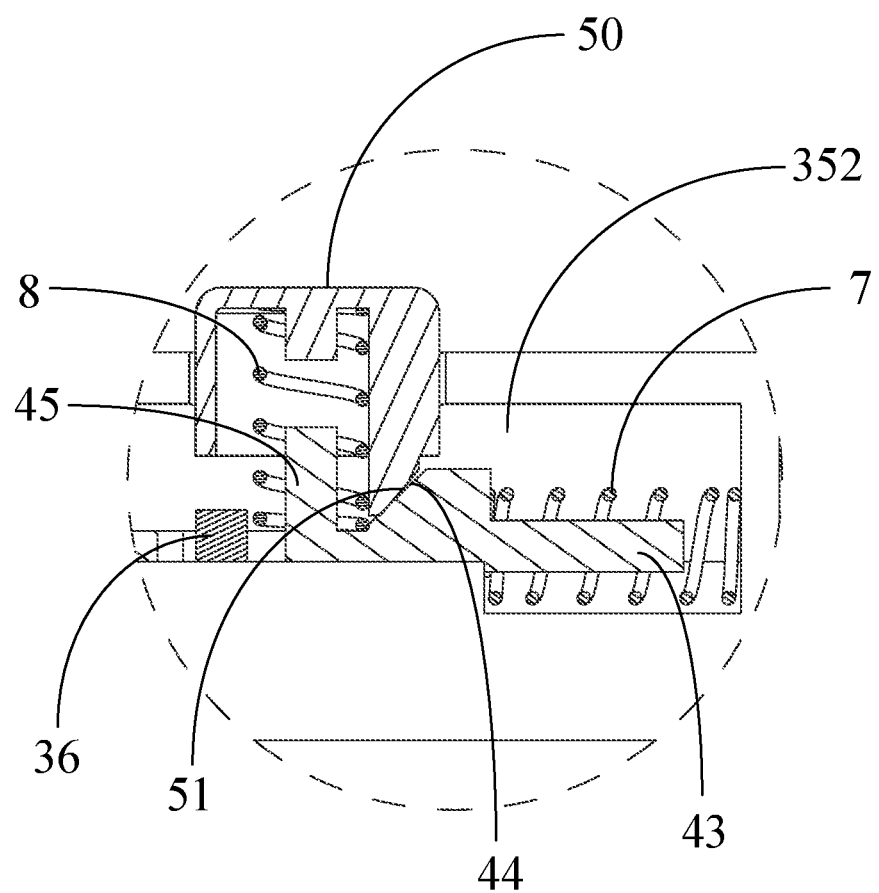
FIG. 13 is an enlarged view B of a circled portion of the schematic sectional view shown in FIG. 11.
Figure 14:
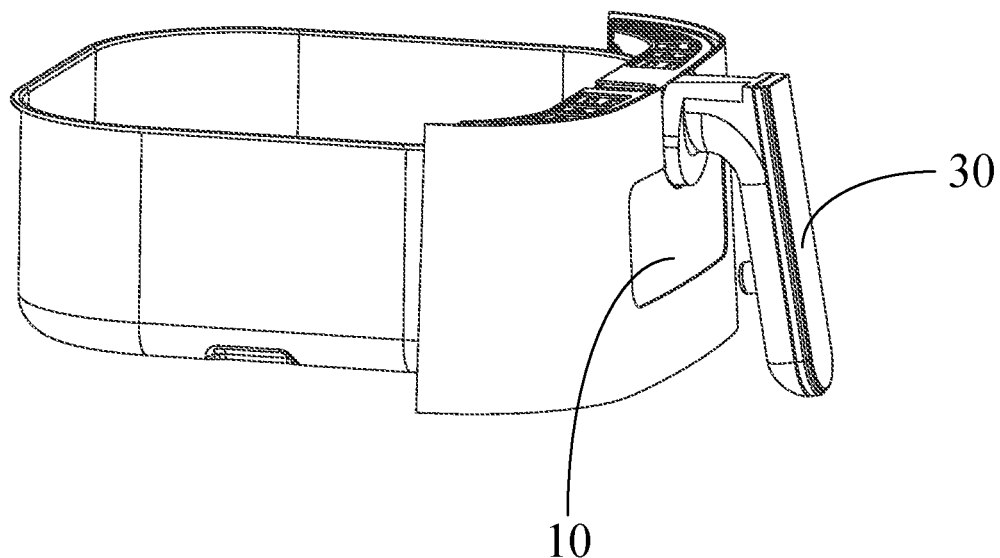
FIG. 14 is a schematic view of an air fryer drawer of a second embodiment of the present disclosure, wherein the handle is in a first state.
Figure 15:
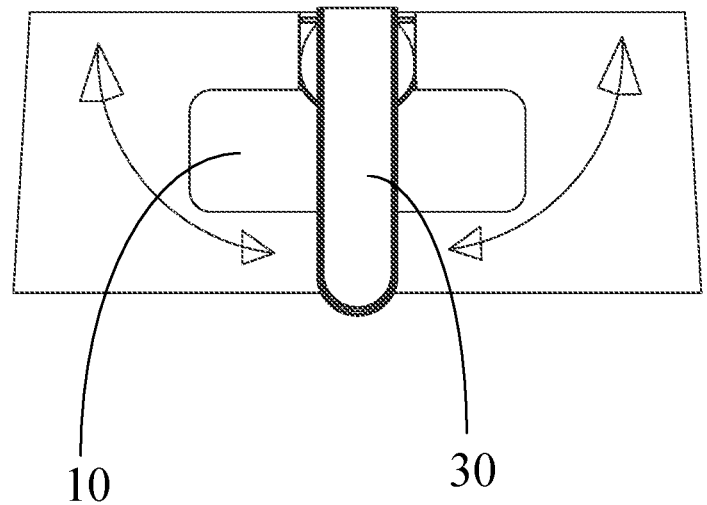
FIG. 15 is a front view of the air fryer drawer shown in FIG. 14.
Figure 16:
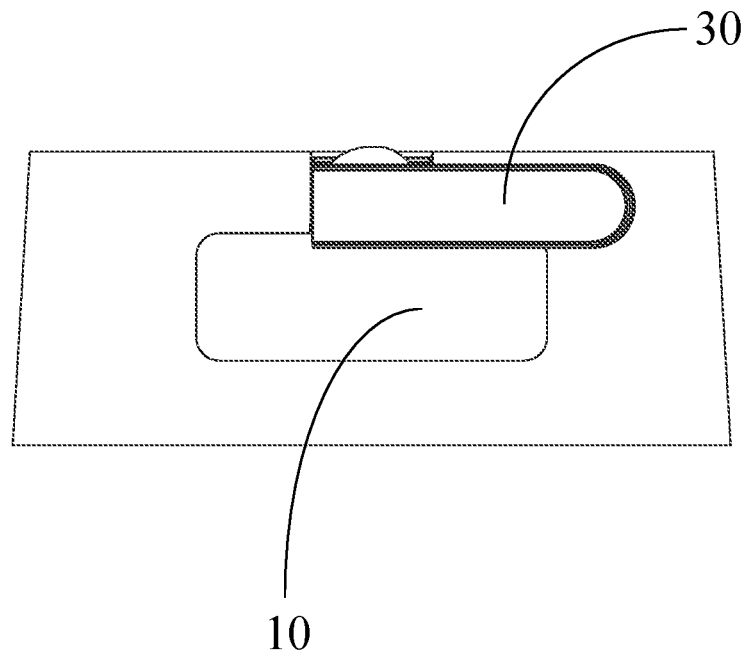
FIG. 16 is a schematic view of the air fryer drawer shown in FIG. 14, wherein the handle is in a second state and the grip handle segment is located above the transparent area.
Figure 17:
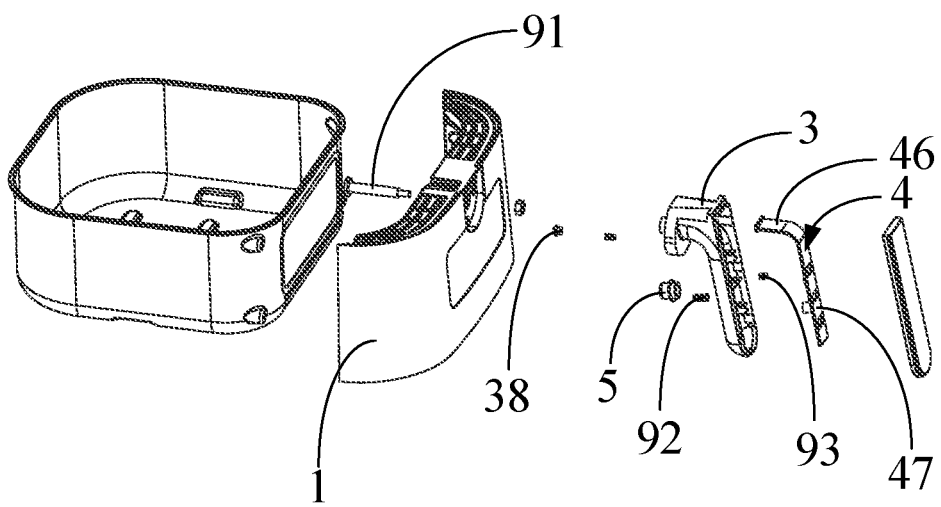
FIG. 17 is an exploded view of the air fryer drawer shown in FIG. 14.
Figure 18:
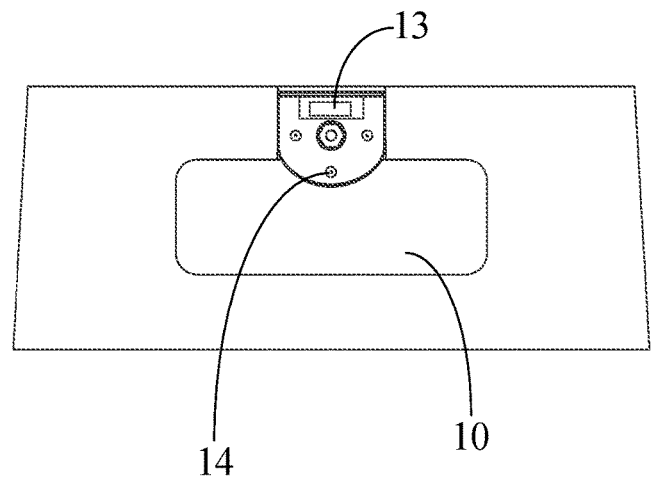
FIG. 18 is a front view of the panel shown in FIG. 17.
Figure 19:
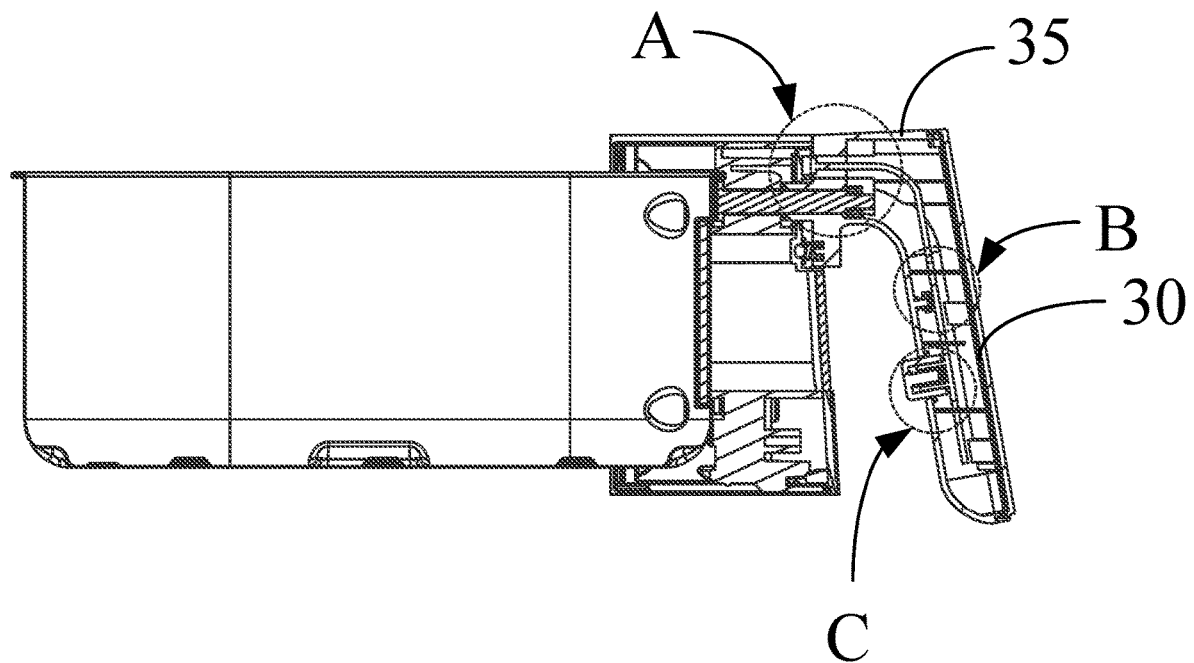
FIG. 19 is a schematic sectional view of the air fryer drawer shown in FIG. 14.
Figure 20:
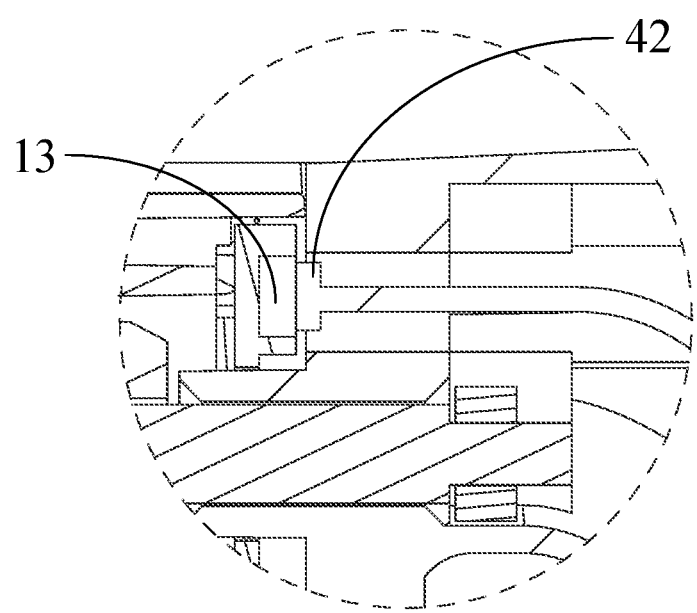
FIG. 20 is an enlarged view A of a circled portion of the schematic sectional view shown in FIG. 19.
Figure 21:
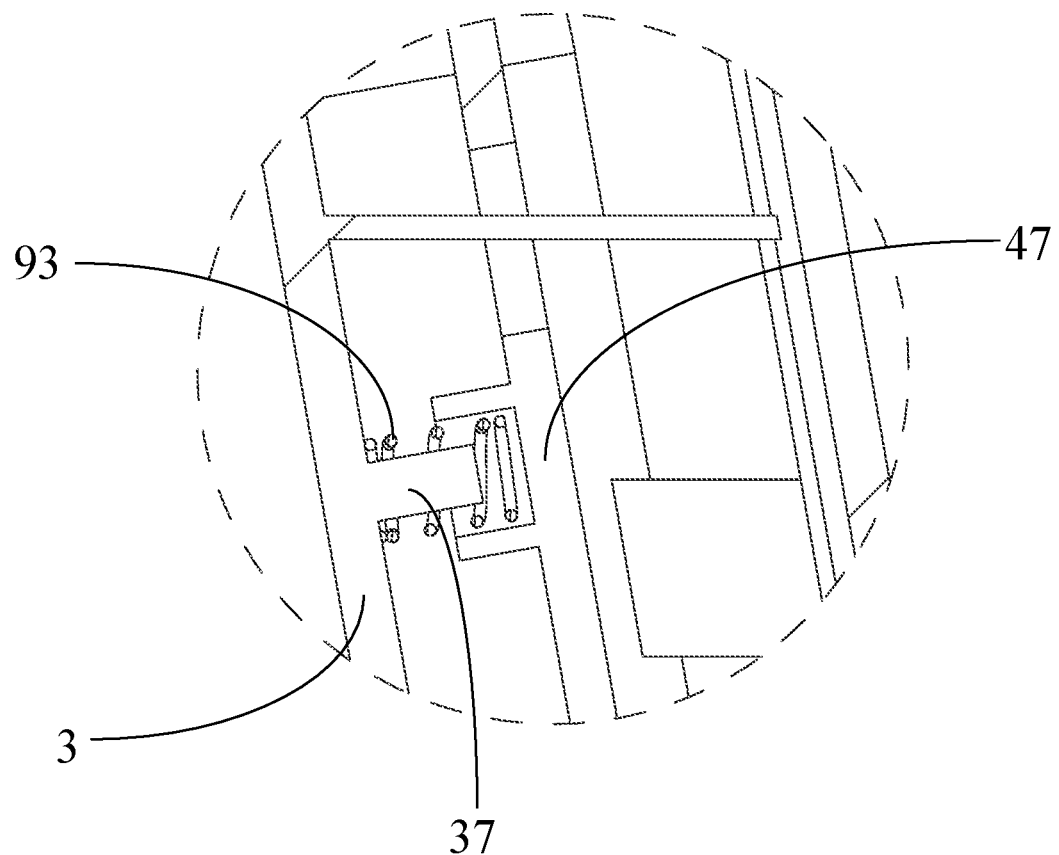
FIG. 21 is an enlarged view B of a circled portion of the schematic sectional view shown in FIG. 19.
Figure 22:
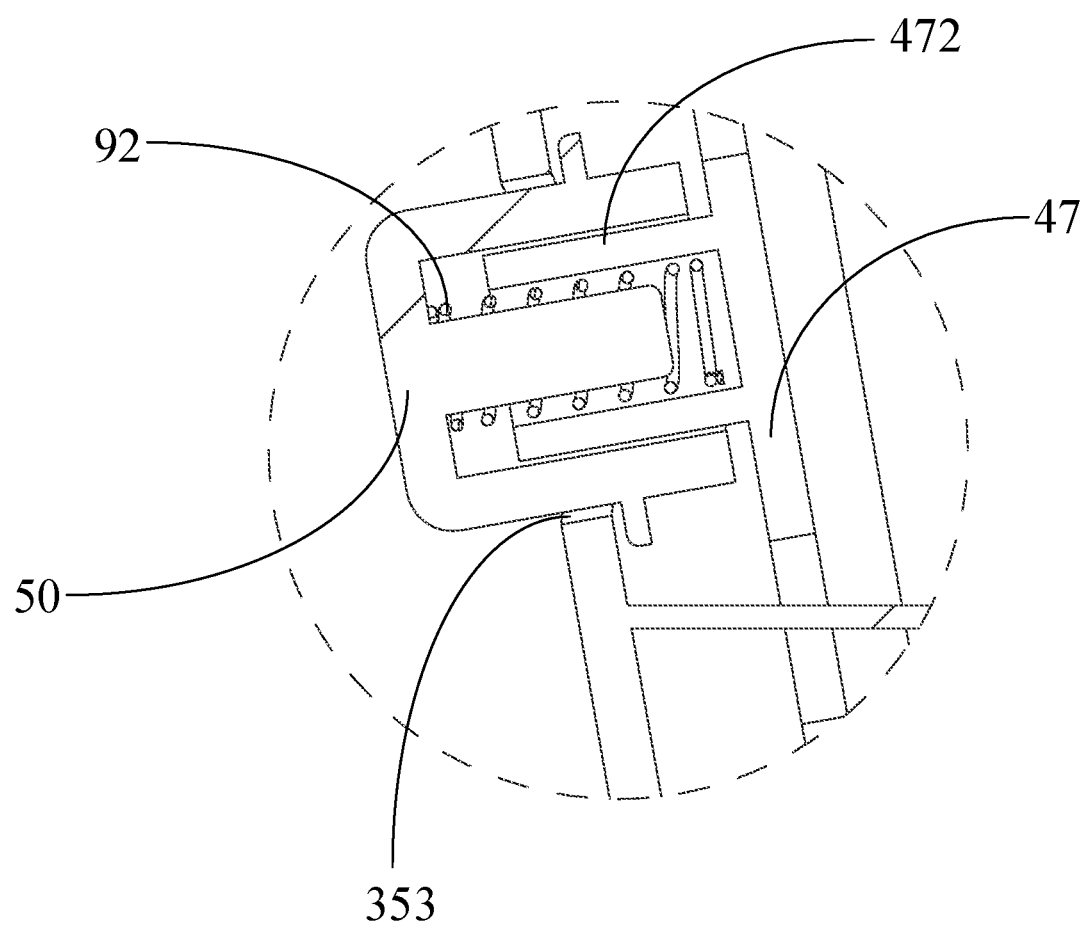
FIG. 22 is an enlarged view C of a circled portion of the schematic sectional view shown in FIG. 19.

As shown in FIGS. 11 to 13, the base portion 40 and the first limiting portion 43 of the locking device 4 are received in the receiving space 352. One end of the first elastic member 7 is sleeved on the first limiting portion 43, and the other end thereof abuts the handle 3. The device for unlocking 5 is inserted into the receiving space 352 from the through hole 353, so that the upper inclined portion 51 is connected to the lower inclined portion 44. One end of the second elastic member 8 abuts the pressing portion 50, and the other end thereof is sleeved on the second limiting portion 45. When the connecting portion 41 is received in the receiving space 352, the spindle 6 is assembled in the assembly hole 350 so as to limit the handle 3 to the panel 1. The locking portion 42 passes through the through hole 60 of the spindle 6.

When one end of the locking portion 42 is inserted into the receiving portion 13 of the panel 1, the locking device 4 abuts the panel 1 so that the handle is non-rotatable. When it is necessary to rotate the handle 3, the device for unlocking 5 is pressed, causing the device for unlocking 5 to push the locking device 4 to move in a direction away from the receiving portion 13, so that the locking portion 42 exits the receiving portion 13, and with the locking portion 42 being disengaged from the panel 1, the handle becomes rotatable.

When the air fryer drawer 100 is in use, the device for unlocking 5 being subjected to force causes the locking device 4 to switch between a first position and a second position. One end of the locking device 4 is inserted into the receiving portion 13 when the locking device 4 is in the first position, at which time the handle 3 is non-rotatable. The one end of the locking device 4 exits the receiving portion 13 when the locking device 4 is in the second position, at which time the handle 3 is rotatable. When the pressing portion 50 is pressed, the upper inclined portion 51 moves along the lower inclined portion 44 to butt against the locking device 4, causing the locking device 4 to move in a direction away from the panel 1, and the locking portion 42 exits the receiving portion 13 of the panel 1.

When the device for unlocking 5 is pressed, it presses the second elastic member 8. When the device for unlocking 5 is released, the butting force of the second elastic member 8 drives the device for unlocking 5 to move upward, so that the device for unlocking 5 does not hinder the movement of the locking device 4 toward the first position. When the locking device 4 moves in a direction away from the panel 1 due to butting by the device for unlocking 5, the locking portion 42 exits the receiving portion 13 of the panel 1 and the locking device 4 presses the first elastic member 7. When the locking device 4 is disengaged from the device for unlocking 5, the butting force of the first elastic member 7 drives the locking device 4 to move toward the panel 1 so that the locking portion 42 is inserted into the receiving portion 13.

The axis of rotation of handle 3 relative to the panel 1 is vertically disposed so that the grip handle segment 30 is rotated to the left or right of the transparent area 10, to prevent the grip handle segment 30 from blocking the transparent area 10. The locking device 4 moves perpendicularly to the axis, so as to lock or unlock the handle 3.

In FIGS. 1 to 13, the spindles 6 are assembled with the handle 3 and the upper fastening portions 11 and the lower fastening portions 12, so that the handle 3 can be rotated relative to the panel 1. The spindles 6 can also be disposed on the handle 3 with their free ends assembled with the upper fastening portions 11 or the lower fastening portions 12.

Shown in FIGS. 14 to 22 is an air fryer drawer 100 of a second embodiment of the present disclosure. The handle 3 is rotatable relative to the panel 1 toward the upper-left direction and/or the upper-right direction, so that the grip handle segment 30 is deviated from or positioned adjacent to the transparent area 10. The grip handle segment 30 can be rotated adjacent to the transparent area 10, to prevent the grip handle segment 30 from blocking vision of the transparent area 10.

The air fryer drawer 100 comprises a pivot shaft 91 assembled with the panel 1 and the handle 3 and configured to rotatably attach the handle 3 to the panel 1. The pivot shaft 91 is disposed perpendicularly to the panel 1.

The handle 3 comprises a horizontal connecting segment 35 extended outward from the top of the grip handle segment 30. The pivot shaft 91 is assembled with the horizontal connecting segment 35. The locking device 4 is flat and comprises a main body 47 and an extended portion 46 bent from the main body 47. The locking portion 42 is disposed at the free end of the extended portion 46. Both the locking portion 42 and the receiving portion 13 are rectangular. So long as the locking portion 42 and the receiving portion 13 are non-circular, the rotation of the locking portion 42 relative to the receiving portion 13 can be limited.

The main body 47 is received in the grip handle segment 30, and the extended portion 46 is received in the horizontal connecting segment 35. The main body 47 comprises a first positioning pole 471 and a second positioning pole 472. The second positioning pole 472 is located below the first positioning pole 471. The handle 3 comprises a supporting portion 37 extended from the grip handle segment 30 toward the main body 47. The supporting portion 37 abuts the main body 47.

The supporting portion 37 is located between the device for unlocking 5 and the locking portion 42. Using principles of a lever, when the device for unlocking 5 butts against the main body 47, the presence of the supporting portion 37 causes the extended portion 46 to move toward the panel 1, thereby causing the locking portion 42 to be inserted into the receiving portion 13 and making the handle non-rotatable. When the device for unlocking 5 is released, the main body 47 is disengaged from the device for unlocking 5, the locking portion 42 is caused to exit the receiving portion 13, and the handle 3 becomes rotatable.

The grip handle segment 30 is provided with a through hole 353 for the device for unlocking 5 to pass through. The air fryer drawer 100 further comprises a third elastic member 92 and a fourth elastic member 93. One end of the third elastic member 92 is received in the space of the second positioning pole 472, and the other end thereof butts against the pressing portion 50. When the pressing portion 50 is pressed, the pressing portion 50 presses the third elastic member 92 and causes the third elastic member 92 to butt against the main body 47 of the locking device 4. When the pressing portion 50 is released, the butting force of the third elastic member 92 causes the device for unlocking 5 to return to its original state.

One end of the fourth elastic member 93 is sleeved on the supporting portion 37 and the other end thereof is received in the space of the first positioning pole 471. The fourth elastic member 93 is configured to support the main body 47 of the locking device 4.

The panel 1 further comprises a plurality of receiving portions 14. The air fryer drawer 100 comprises stop 38, for example, in the form of a stopper ball 38. When the handle 3 is rotated relative to the panel 1, the stop 38 can be received in the receiving portion 14 to enable adjustment of the position of the grip handle segment 30 relative to the transparent area 10 and provide multiple angles of rotation to meet different requirements.

In some embodiments, the air fryer drawer 100 of the present disclosure comprises a locking device 4 and a device for unlocking 5 to enable the handle 3 to be rotated between a first state and a second state relative to the panel 1, so that the grip handle segment 30 can be deviated from the transparent area to prevent the grip handle segment 30 from blocking the transparent area 10, thereby facilitating user observation of the cooking conditions in the fryer basket. The locking device 4 is capable of locking the handle 3 to prevent the handle 3 from being rotated and facilitate holding of the handle 3 for operational convenience of the air fryer drawer 100.

The foregoing merely describes preferred embodiments of the present disclosure, instead of limiting it in any way. While preferred embodiments of the present disclosure have been disclosed above, they are not intended to limit the present disclosure. Any persons skilled in the art may contemplate equivalent embodiments by making some alteration or modification to the disclosure without departing from the scope of the present disclosure. However, any alteration, equivalent change and modification made without departing from the spirit of the present disclosure shall fall within the scope of protection thereof.

The invention claimed is:

1. An air fryer drawer comprising:
   a panel;
   a fryer basket fixed to the rear side of the panel to receive food to be fried; and, a handle disposed at the front side of the panel;
   wherein the panel is provided with a transparent area through which a user can observe the conditions of the food being fried in the fryer basket;
   wherein the handle comprises a grip handle segment;
   wherein the handle is rotatable between a first state and a second state relative to the panel, the grip handle segment being located at the front side of the transparent area when the handle is in the first state to facilitate manipulation of the grip handle segment, and the grip handle segment is deviated from the transparent area when the handle is in the second state to facilitate observation of the conditions of the food being fried in the fryer basket
   wherein the air fryer drawer comprises a locking device and a device for unlocking;
   wherein the locking device locks the handle when the handle is in the first state and is non-rotatable;
   wherein the handle rotatable to the second state by unlocking the device for unlocking;
   wherein the panel is provided with a receiving portion;
   wherein when the device for locking is subjected to a force, the locking device switches between a first position and a second position, wherein one end of the locking device is inserted into the receiving portion when the locking device is in the first position, at which time the handle is non-rotatable, and wherein the one end of the locking device exits the receiving portion when the locking device is in the second position, at which time the handle is rotatable;

wherein the device for unlocking comprises a pressing portion and an upper inclined portion disposed thereon;

the locking device comprises a lower inclined portion; and, wherein when the pressing portion is pressed, the upper inclined portion moves along the lower inclined portion to move the locking device.

2. The air fryer drawer of claim 1, wherein the air fryer drawer comprises a first elastic member located between the locking device and the handle, and the first elastic member is pressed by the locking device when the locking device moves from the first position to the second position;

wherein when the device for unlocking is released, the elastic force of the first elastic member butts against the locking device, causing the locking device to move to the first position;

the air fryer drawer further comprises a second elastic member located between the device for unlocking and the locking device, wherein when the device for unlocking is released, the butting force of the second elastic member moves the device for unlocking upward, thus preventing the device for unlocking from hindering the movement of the locking device toward the first position.

3. The air fryer drawer of claim 1, wherein the axis of rotation of the handle relative to the panel is vertically disposed, and the locking device moves perpendicularly to the axis.

4. The air fryer drawer of claim 3, wherein the handle comprises a horizontal connecting segment whose one end is rotatably connected to the panel and the grip handle segment is connected to the other end of the horizontal connecting segment, the locking device being disposed on the horizontal connecting segment.

5. The air fryer drawer of claim 4, wherein an other end of the grip handle segment is extended downward and connected to another horizontal connecting segment, the another horizontal connecting segment being rotatably connected to the panel.

6. The air fryer drawer of claim 3, wherein the air fryer drawer comprises at least one spindle rotatably connected to the handle and the panel, wherein a spindle of the at least one spindle is provided with a through hole for the locking device to pass through.

7. An air fryer comprising a main body having a cooking chamber, and the air fryer drawer of claim 1, the air fryer drawer being removably inserted into the cooking chamber.

* * * * *